United States Patent
Yi et al.

(10) Patent No.: US 12,504,124 B2
(45) Date of Patent: Dec. 23, 2025

(54) LIQUEFIED HYDROGEN STORAGE TANK, AND METHOD FOR CONTROLLING TEMPERATURE OF LIQUEFIED HYDROGEN STORAGE TANK

(71) Applicant: KOREA GAS CORPORATION, Daegu (KR)

(72) Inventors: Jong Yeol Yi, Daegu (KR); Yong Seong Jeon, Daegu (KR); Jae Hyun Ma, Daegu (KR); Ji Hoon Joung, Daegu (KR); Hae Chul Han, Daegu (KR); Eun Young Yun, Daegu (KR); Jin Yeong Park, Daegu (KR)

(73) Assignee: Korea Gas Corporation, Daegu (KR)

( * ) Notice: Subject to any disclaimer, the term of this patent is extended or adjusted under 35 U.S.C. 154(b) by 207 days.

(21) Appl. No.: 18/003,667

(22) PCT Filed: Aug. 11, 2022

(86) PCT No.: PCT/KR2022/011981
§ 371 (c)(1),
(2) Date: Dec. 28, 2022

(87) PCT Pub. No.: WO2024/029654
PCT Pub. Date: Feb. 8, 2024

(65) Prior Publication Data
US 2024/0240754 A1 Jul. 18, 2024

(30) Foreign Application Priority Data
Aug. 1, 2022 (KR) .......................... 10-2022-0095458

(51) Int. Cl.
*F17C 3/06* (2006.01)

(52) U.S. Cl.
CPC ............. *F17C 3/06* (2013.01); *F17C 2203/03* (2013.01); *F17C 2221/012* (2013.01); *F17C 2223/0161* (2013.01)

(58) Field of Classification Search
None
See application file for complete search history.

(56) References Cited

U.S. PATENT DOCUMENTS 1,712,321 A * 5/1929 Afonin ................... B65D 88/36
220/218
2,526,221 A * 10/1950 Goddard ................... F17C 9/00
60/915

(Continued)

FOREIGN PATENT DOCUMENTS

CN 116538420 A * 8/2023
DE 4411338 A1 * 10/1995 ................ F17C 9/00

(Continued)

OTHER PUBLICATIONS

KR20210116956A English Machine Translation (Year: 2021).*

(Continued)

*Primary Examiner* — Jenna M Maroney
(74) *Attorney, Agent, or Firm* — Knobbe, Martens, Olson & Bear, LLP

(57) ABSTRACT

A liquefied hydrogen storage tank is provided in a storage facility storing a large amount of hydrogen in a liquefied state or a vehicle transporting liquefied hydrogen and a liquefied hydrogen storage tank. The liquefied hydrogen storage tank is a storage container storing liquefied hydrogen. The liquefied hydrogen storage tank includes an inner space including a lower space in which liquefied hydrogen is stored and an upper space in which a gas is stored and further includes a heat inflow prevention unit disposed in the upper space or at an interface between the upper space and the lower space and preventing inflow of thermal energy into (Continued)

the lower space through the upper space. The temperature of the liquefied hydrogen storage tank is controlled, the generation rate of boil-off gas from liquefied hydrogen is controlled, and the liquefied hydrogen storage tank is maintained at a low pressure.

6 Claims, 1 Drawing Sheet

(56) References Cited

U.S. PATENT DOCUMENTS

| | | | | |
|---|---|---|---|---|
| 2,798,633 | A * | 7/1957 | Cornell | B65D 88/78 220/221 |
| 3,196,622 | A * | 7/1965 | Smith | F17C 3/005 220/592.27 |
| 3,254,498 | A * | 6/1966 | Becker | F17C 13/02 62/45.1 |
| 3,346,138 | A * | 10/1967 | Tubbs | E03B 11/00 220/216 |
| 3,366,266 | A * | 1/1968 | Heartstedt | B65D 88/34 220/216 |
| 3,419,174 | A * | 12/1968 | Engdahl | F17C 3/022 220/560.12 |
| 3,527,379 | A * | 9/1970 | Mair | F17C 13/025 62/48.3 |
| 3,687,329 | A * | 8/1972 | Baum | B65D 90/42 220/88.1 |
| 3,748,865 | A * | 7/1973 | Laverman | F17C 13/001 62/48.3 |
| 4,110,995 | A * | 9/1978 | Marchaj | F17C 13/004 62/48.1 |
| 4,189,058 | A * | 2/1980 | Seliskar | B65D 88/34 220/218 |
| 6,220,469 | B1 * | 4/2001 | Basseches | B65D 88/34 220/216 |
| 6,367,647 | B1 * | 4/2002 | Rudiger | F17C 1/00 220/560.04 |
| 7,591,138 | B2 * | 9/2009 | Ikeuchi | C01B 21/00 62/601 |
| 7,712,605 | B2 * | 5/2010 | Suzuki | F17C 11/005 165/157 |
| 8,297,460 | B2 * | 10/2012 | Riordan | B65D 90/38 428/920 |
| 8,616,398 | B2 * | 12/2013 | Riordan | B65D 90/42 428/920 |
| 9,132,303 | B2 * | 9/2015 | Stuhlbacher | A62C 3/06 |
| 9,399,548 | B2 * | 7/2016 | Lipinski | B65D 90/06 |
| 10,209,008 | B2 * | 2/2019 | Dupont | F28D 15/043 |
| 10,905,908 | B2 * | 2/2021 | Sun | A62C 3/065 |
| 2002/0041823 | A1 * | 4/2002 | Blaszczyk | F17C 5/02 422/1 |
| 2004/0182869 | A1 * | 9/2004 | Kubo | F17C 11/005 220/581 |
| 2007/0199941 | A1 * | 8/2007 | Reese | F17C 3/02 62/48.1 |
| 2008/0072609 | A1 | 3/2008 | Ikeuchi et al. | |
| 2012/0312564 | A1 * | 12/2012 | Seliverstov | A62C 35/68 169/68 |
| 2013/0020319 | A1 * | 1/2013 | Riordan | B65D 90/38 220/88.1 |
| 2015/0292454 | A1 * | 10/2015 | Yoshida | B64G 1/4021 123/445 |

FOREIGN PATENT DOCUMENTS

| | | | | |
|---|---|---|---|---|
| DE | 102004061027 A1 | * | 6/2006 | F17C 7/04 |
| DE | 102012207575 A1 | * | 11/2013 | B64D 37/04 |
| DE | 102012207577 A1 | * | 11/2013 | F02C 3/20 |
| EP | 2481968 A2 | * | 8/2012 | F17C 1/12 |
| FR | 3069042 A1 | * | 1/2019 | F17C 13/001 |
| JP | H11-304386 A | | 11/1999 | |
| JP | 4619408 B2 | | 1/2011 | |
| KR | 10-2013-0055603 A | | 5/2013 | |
| KR | 10-2016-0032815 A | | 3/2016 | |
| KR | 10-1756181 B1 | | 7/2017 | |
| KR | 10-2019-0060743 A | | 6/2019 | |
| KR | 10-2021-0116956 A | | 9/2021 | |
| KR | 10-2021-0116957 A | | 9/2021 | |
| KR | 20220147988 A | | 11/2022 | |
| WO | WO-9015003 A | * | 12/1990 | F17C 9/00 |
| WO | WO-2006018146 A1 | * | 2/2006 | F17C 3/02 |
| WO | WO-2013167637 A1 | * | 11/2013 | B64D 37/04 |
| WO | WO-2013167639 A1 | * | 11/2013 | F02C 3/20 |
| WO | WO-2024029654 A1 | * | 2/2024 | B63B 25/16 |

OTHER PUBLICATIONS

English Translation of International Search Report of the corresponding International Application No. PCT/KR2022/011981, dated Apr. 24, 2023.

Office Action receive in Korean Patent Application No. 10-2022-0095458 dated Aug. 6, 2024.

Office Action received in Japanese Patent Application No. 2022-575210 dated Apr. 16, 2025.

* cited by examiner

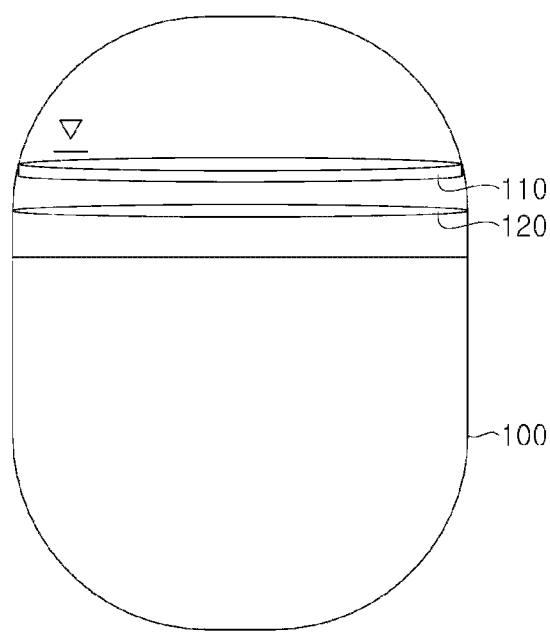

LIQUEFIED HYDROGEN STORAGE TANK, AND METHOD FOR CONTROLLING TEMPERATURE OF LIQUEFIED HYDROGEN STORAGE TANK

TECHNICAL FIELD

The present invention relates to a liquefied hydrogen storage tank applicable to a storage facility storing a large amount of hydrogen in a liquefied state or a vehicle transporting liquefied hydrogen and, more particularly, to a liquefied hydrogen storage tank, and a method for controlling the temperature of the liquefied hydrogen storage tank that can control the generation rate of boil-off gas from liquefied hydrogen and can maintain a liquefied hydrogen storage tank at a low pressure, a system and method for supplying liquefied hydrogen.

BACKGROUND ART

Hydrogen transportation is broadly classified into inland transportation and marine transportation. Inland transportation includes transportation by pipelines, dedicated vehicles with a storage container, or railroads, and marine transportation includes transportation by floating structures such as a ship with a storage facility.

Until recently, hydrogen has been transported and supplied on a small scale after being compressed to a pressure of 200 bar or more and stored in a special container. However, as use of eco-friendly energy becomes more important due to carbon taxes and the like, technology for large-scale long-distance transport is needed. In particular, for efficient transportation of hydrogen, it is necessary to consider storing and transporting hydrogen in a liquid state by liquefying gaseous hydrogen through cooling and compression.

Liquid hydrogen is obtained by cooling gaseous hydrogen to a cryogenic temperature (about −253° C. based on atmospheric pressure), and may be stored in a special insulated storage tank for cryogenic fluids to be maintained in a liquid state during transportation.

Liquefied hydrogen has a volume of about 1/865 that of hydrogen in a gaseous state, and thus has a volumetric energy density 865 times that of gaseous hydrogen for a given pressure. As such, storing hydrogen in a liquid state allows high-density storage, as compared with storing gaseous hydrogen at high pressure, and is advantageous in terms of safety of a storage tank, reduction in storage costs, and reduction in risk of explosion.

Existing liquefied gas storage technologies are targeted at liquefied natural gas (LNG) or liquefied petroleum gas (LPG). Since the liquefaction temperature (or boiling point) of hydrogen is much lower than the liquefaction temperature of natural gas (about −163° C. based on atmospheric pressure), the storage pressure of liquefied hydrogen is much higher than that of LNG. Accordingly, in order to apply such typical storage technologies to hydrogen, it is necessary to increase insulation thickness by several times to dozens of times.

In addition, when liquefied hydrogen is stored using thermal insulation technology available for storage of LNG, the design pressure of a storage tank needs to be set to a high pressure of 3 bar or more based on the triple point of hydrogen. In other words, due to the high storage pressure of liquefied hydrogen, the inner wall thickness of the storage tank inevitably increases to a level exceeding construction and inspection standards.

Accordingly, in storing and transporting a large amount of liquefied hydrogen, it is very important to reduce the storage pressure and improve the level of thermal insulation and energy efficiency provided by the existing liquefied gas storage technologies.

Meanwhile, treatment of boil-off gas is essential in storing and transporting liquefied gas. Accordingly, various methods for treatment of boil-off gas from LNG have been proposed and are being put to practical use.

LNG is maintained in a stable state at a pressure of about 0.36 bar and a temperature of about −163° C., whereas liquefied hydrogen is stored at a temperature of −253° C., which is about 90 degrees lower than the storage temperature of LNG, and a pressure of 2 bar to 6 bar, which is several times the storage pressure of LNG, that is, 0.36 bar. In addition, since liquefied hydrogen has the property that boil-off gas is irregularly generated due to ortho-para conversion, there is a limitation in applying technology for treatment of boil-off gas from LNG to treatment of liquefied hydrogen.

DISCLOSURE

Technical Tasks

Embodiments of the present invention are conceived to solve such problems in the art and it is one object of the present invention to provide a temperature control method which can maintain a large capacity liquefied hydrogen storage tank at a low pressure during storage, transport, and unloading of liquefied hydrogen.

It is a further object of the present invention to provide a liquefied hydrogen storage tank, and a method for controlling the temperature of the liquefied hydrogen storage tank which can maintain a liquefied hydrogen storage tank at a low pressure through control over the generation rate of boil-off gas, which tends to be generated irregularly due to ortho-para conversion of hydrogen, thereby allowing increase in capacity of the liquefied hydrogen storage tank.

It will be understood that technical problems to be solved by the present invention and objects of the present invention are not limited to the above. Other technical problems to be solved by the present invention and other objects of the present invention will become apparent to those skilled in the art from the detailed description of the following embodiments in conjunction with the accompanying drawings.

Technical Solution

In accordance with one aspect of the present invention, there is provided a liquefied hydrogen storage tank which is a storage container storing liquefied hydrogen, the liquefied hydrogen storage tank having an inner space comprising a lower space in which liquefied hydrogen is stored and an upper space in which a gas is stored, wherein the liquefied hydrogen storage tank includes a heat inflow prevention unit disposed in the upper space or at an interface between the upper space and the lower space and preventing inflow of thermal energy into the lower space through the upper space.

The heat inflow prevention unit may be disposed at a fixed location corresponding to a maximum allowable level of the liquefied hydrogen in the liquefied hydrogen storage tank.

The heat inflow prevention unit may adjoin a surface of the liquefied hydrogen stored in the liquefied hydrogen storage tank or may be at least partially immersed in the liquefied hydrogen. Here, the heat inflow prevention may be variable in location depending on the level of the liquefied hydrogen.

The heat inflow prevention unit may include a gas layer between the heat inflow prevention unit and the surface of the liquefied hydrogen stored in the liquefied hydrogen storage tank to be disposed at a location spaced apart from the surface of the liquefied hydrogen.

The heat inflow prevention unit may include: any one or more of a floating plate floating in the liquefied hydrogen stored in the liquefied hydrogen storage tank or adjoining the surface of the liquefied hydrogen; and an upper heat exchanger cooling the upper space or the surface of the liquefied hydrogen in the lower space.

The floating plate may be formed of a heat insulating material having a lower density than the liquefied hydrogen and having buoyancy.

The floating plate may include: a body; and a powdered heat insulating material packed in the body.

The floating plate may include one or more floating plates.

In accordance with another aspect of the present invention, a method for controlling a temperature of the liquefied hydrogen storage tank set for the above includes: suppressing evaporation of liquefied hydrogen stored in the liquefied hydrogen storage tank by solidifying a surface layer of the liquefied hydrogen through cooling of the upper space.

Advantageous Effects

The liquefied hydrogen storage tank, and a method for controlling the temperature of the liquefied hydrogen storage tank according to the present invention can maintain the storage pressure of liquefied hydrogen at atmospheric pressure levels by cooling the inside of a storage tank and solidifying a portion of liquefied hydrogen stored in the storage tank to allow liquefied hydrogen to be stored in a stable state in the storage tank.

In addition, according to the present invention, cryogenic heat and latent heat of evaporation can be further obtained from hydrogen in a liquid state by solidifying a portion of liquefied hydrogen.

In addition, due to reduction in storage pressure of liquefied hydrogen, it is possible to reduce the thickness of an inner wall of a liquefied hydrogen storage tank, thereby allowing increase in size of the liquefied hydrogen storage tank.

Typically, a liquefied hydrogen storage tank is connected to a fuel cell to use boil-off gas from liquefied hydrogen as fuel for the fuel cell. However, there is a problem that the generation rate of boil-off gas varies over time and depending on the external temperature. According to the present invention, the generation of boil-off gas, which tends to be generated irregularly, can be controlled to a constant level through control over the internal temperature of a liquefied hydrogen storage tank, thereby allowing stable supply of hydrogen fuel to a fuel cell and thus stable production and supply of electric power.

Upon transportation of cryogenic liquefied gas by sea, sloshing may occur in a storage tank during high wave conditions, causing damage to the storage tank. According to the present invention, a portion of liquefied hydrogen stored in the storage tank is phase-changed into a solid, which has higher viscosity, thereby suppressing sloshing in the storage tank and ensuring transportation safety.

Stable long-term storage of a large amount of liquefied hydrogen in a cryogenic state requires a process efficiently utilizing cold heat as well as insulation of a liquefied hydrogen storage tank. According to the present invention, cold heat recovered from liquefied hydrogen is transferred between a low-temperature tank and a high-temperature tank to be used to control the generation of boil-off gas, thereby allowing stable production of electric power, which, in turn, is utilized to cool liquefied hydrogen. In this way, efficiency of the overall control process can be increased, thereby allowing liquefied hydrogen to be maintained and stored in a cryogenic liquid state for a long time.

In addition, according to the present invention, high energy-efficiency boil-off gas control technology can be applied during storage and transportation of liquefied hydrogen as well as to a liquefied hydrogen terminal where unloading of liquefied hydrogen is performed, such as a liquefied hydrogen supply station and a liquefied hydrogen receiving station.

DESCRIPTION OF DRAWINGS

FIGURE is a schematic view of a liquefied hydrogen storage tank according to one embodiment of the present invention.

EMBODIMENTS

The above and other aspects, features, and advantages of the present invention will become apparent from the detailed description of the following embodiments in conjunction with the accompanying drawings.

Hereinafter, embodiments of the present invention will be described with reference to the accompanying drawings. It should be noted that like components will be denoted by like reference numerals throughout the specification and the accompanying drawings. In addition, it should be understood that the present invention may be embodied in different ways and is not limited to the following embodiments.

A liquefied hydrogen storage tank, a system and method for controlling boil-off gas from liquefied hydrogen, and a system and method for supplying liquefied hydrogen according to embodiments of the present invention described below may be applied to both onshore and offshore storage facilities and vehicles.

In the following description, it is assumed that embodiments of the present invention are used in offshore applications and a vehicle provided with a liquefied hydrogen storage tank is a ship.

In addition, a demand site supplied with liquefied hydrogen is an onshore liquefied hydrogen storage station.

The ship to which embodiments of the present invention are applied is a ship provided with a liquefied hydrogen storage facility, and may include self-propelled vessels, such as a liquefied hydrogen carrier, and non-self-propelled floating offshore structures, such as a floating production storage offloading (FPSO) and a floating storage regasification unit (FSRU). However, in embodiments described below, it is assumed that the ship is a liquefied hydrogen carrier.

Hereinafter, a liquefied hydrogen storage tank, a system and method for controlling boil-off gas from liquefied hydrogen according to embodiments of the present invention will be described with reference to FIG. 1.

Referring to FIG. 1, a liquefied hydrogen storage tank 100 according to one embodiment of the present invention is a storage container capable of storing liquefied hydrogen therein, and has an inner space including a lower space (liquid space) in which liquefied hydrogen is stored and an upper space (vapor space) in which a low-density gas is stored.

In addition, the liquefied hydrogen storage tank 100 according to this embodiment includes a heat inflow prevention unit disposed in the upper space or at an interface between the upper space and the lower space to control the temperature of a surface layer of liquefied hydrogen stored in the lower space or the temperature of the upper space.

Here, the lower space and the upper space are not physically separated from each other and the volumes of the upper space and the lower space depend on the level of liquefied hydrogen in the liquefied hydrogen storage tank. In addition, the volumes of the upper space and the lower space also depend on the period of time between loading and unloading of liquefied hydrogen to and from the storage tank 100 and the temperature change in the storage tank 100. In addition, the volumes of the upper space and the lower space are inversely related to each other. That is, the volume of the lower space decreases with increasing volume of the upper space and vice versa.

The heat inflow prevention unit according to this embodiment may be disposed at a fixed location corresponding to a maximum allowable level of liquefied hydrogen in the storage tank 100, or may be variable in location depending on the level of liquefied hydrogen in the storage tank 100.

In addition, the heat inflow prevention unit may adjoin the surface of liquefied hydrogen stored in the storage tank 100, or may be immersed only at a lower end thereof in liquefied hydrogen stored in the storage tank 100.

Alternatively, the heat inflow prevention unit may include a gas layer between the heat inflow prevention unit and the surface of liquefied hydrogen stored in the storage tank 100 to be disposed in the upper space at a location spaced apart from the surface of the stored liquefied hydrogen.

The heat inflow prevention unit according to this embodiment may include at least one selected from among a floating plate 110 that floats on the surface of the stored liquefied hydrogen or adjoins the surface of the stored liquefied hydrogen and an upper heat exchanger 120 disposed at a location lower than the floating plate 110 and controlling the temperature of the upper space, which has a relatively low density and a relatively high temperature.

The floating plate 110 according to this embodiment is formed of a material that can float on the surface of liquefied hydrogen stored in the storage tank 100 while having heat insulation properties, and serves to prevent external heat introduced into an upper portion of the inner space from the outside of the storage tank from flowing into the surface layer of liquefied hydrogen.

In this embodiment, the heat insulating material forming the floating plate 110 may include at least one selected from the group consisting of polyurethane foam (PUF) and hollow glass bubbles.

The floating plate 110 may include a material that has a lower density than liquefied hydrogen and has buoyancy in liquefied hydrogen. Alternatively, the floating plate 110 may include a body and a powdered heat insulating material packed in the body so as to have buoyancy.

In this embodiment, the heat inflow prevention unit may include multiple floating plates 110. When the heat inflow prevention unit includes multiple floating plates 110, it is possible to prevent shrinkage of the floating plate 110 due to cryogenic temperatures of liquefied hydrogen or damage to the floating plate 110 due to sloshing of liquefied hydrogen during transport of the storage tank 100.

The upper heat exchanger 120 according to this embodiment cools the upper space to prevent intrusion of external heat (such as solar heat) through the upper portion of the storage tank 100 to a certain degree and to inhibit external air introduced into the storage tank 100 from exchanging heat with the surface layer of liquefied hydrogen stored in the storage tank.

The upper heat exchanger 120 may be disposed under the floating plate 110, and may be connected to the floating plate 110. By cooling the upper space of the storage tank 100 or the surface layer of liquefied hydrogen using the upper heat exchanger 120, it is possible to effectively control generation of boil-off gas and to achieve improved cooling efficiency.

The upper heat exchanger 120 may be a tube type or plate type heat exchanger.

According to this embodiment, the upper heat exchanger 120 may be connected to a refrigerator (not shown) that supplies a refrigerant for cooling liquefied hydrogen.

In this embodiment, the refrigerant may be helium and the refrigerator may supply helium at a temperature of about 4.5 K to about 21 K to the upper heat exchanger 120.

Next, a method for controlling the internal temperature of the liquefied hydrogen storage tank 100 according to this embodiment and generation boil-off gas from liquefied hydrogen in the liquefied hydrogen storage tank 100 will be described.

The liquefied hydrogen storage tank 100 according to this embodiment is a large-capacity storage tank having a volume of 100 $m^3$ or more, and may include at least two liquefied hydrogen storage tanks.

In addition, the storage tank 100 according to this embodiment may be operated at a pressure of 0.1 bar to 6 bar, preferably a pressure of 3 bar or less, more preferably a pressure of 1 bar or less or atmospheric pressure.

The upper space of the storage tank 100 according to this embodiment may be maintained in a temperature range in which liquefied hydrogen is present in a solid-liquid mixed state, for example, at a temperature in the range of about 13 K to 21 K, 20 K or less, or 13 K to 14 K, by the heat inflow prevention unit.

Within this temperature range, at least a portion of liquefied hydrogen is present in a solid state denser than a liquid state and thus the liquefied hydrogen is present in a solid-liquid mixed state, preferably in the form of a slurry.

Density of liquefied hydrogen changes by about 1 $kg/m^3$ in response to a temperature change of 1 K. For example, the liquefied hydrogen has a density of about 77 $kg/m^3$ at a temperature of 14 K and a density of 77 $kg/m^3$ at a temperature of 21 K.

In addition, the upper space of the storage tank 100 according to this embodiment may be maintained at the triple-point temperature of liquefied hydrogen by the heat inflow prevention unit.

When a portion of liquefied hydrogen stored in the storage tank 100, particularly the surface of the liquefied hydrogen, is allowed to be present in the form of a slurry, it is possible to suppress the tendency of liquefied hydrogen to evaporate, thereby allowing storage of hydrogen in a stable liquid state.

As a portion of the liquefied hydrogen begins to solidify, ortho-para conversion of the liquefied hydrogen is suppressed, thereby preventing liquid-to-gas phase change and further evaporation of the liquefied hydrogen and thus maintaining the liquefied hydrogen in a stable state. A portion of liquefied hydrogen stored in the storage tank 100, particularly, the surface layer of the liquefied hydrogen, may be allowed to be present in the form of a slurry by the upper heat exchanger 120.

The upper heat exchanger 120 solidifies a portion of liquefied hydrogen stored in the storage tank 100, specifically, liquefied hydrogen around the location of the upper heat exchanger 120. The upper heat exchanger 120 accordingly to this embodiment may be selectively activated when reactivity of the liquefied hydrogen stored in the storage tank 100 increases above a reference value or at a temperature lower than or equal to a specific temperature.

According to this embodiment, stable storage of hydrogen can be achieved by solidifying a portion of liquefied hydrogen stored in the large capacity storage tank 100, rather than the entirety of the liquefied hydrogen, using the upper heat exchanger 120 disposed in the upper space of the storage tank 100 as a solidification device inducing liquid-to-solid phase change of liquefied hydrogen, such that a portion of hydrogen in the storage tank is present in a solid state retaining a larger amount of cold heat, thereby maximizing retention of latent heat in the hydrogen.

Although some embodiments have been described herein, it should be understood by those skilled in the art that these embodiments are given by way of illustration only and the present invention is not limited thereto. In addition, it should be understood that various modifications, variations, and alterations can be made by those skilled in the art without departing from the spirit and scope of the present invention.

LIST OF REFERENCE NUMERALS

100: Liquefied hydrogen storage tank
110: Floating plate
120: Upper heat exchange

The invention claimed is:

1. A liquefied hydrogen storage tank acting as a storage container storing liquefied hydrogen, the liquefied hydrogen storage tank having an inner space comprising a lower space in which the liquefied hydrogen is stored and an upper space in which a gas is stored, wherein the liquefied hydrogen storage tank comprises a heat inflow prevention unit adjoining a surface of the liquefied hydrogen stored in the liquefied hydrogen storage tank or at least partially immersed in the liquefied hydrogen, wherein the heat inflow prevention unit comprises:

one or more floating plates floating in the liquefied hydrogen stored in the liquefied hydrogen storage tank or adjoining the surface of the liquefied hydrogen; and a heat exchanger disposed and connected under the one or more floating plates, wherein the heat inflow prevention unit is variable in location depending of the level of the liquefied hydrogen, and wherein the heat exchanger is configured to cool a surface layer of the liquefied hydrogen and maintain the surface layer of the liquefied hydrogen in a temperature range in which the liquefied hydrogen is present in a solid-liquid mixed slurry state such that the surface layer is in the solid-liquid mixed slurry state to suppress evaporation of the liquefied hydrogen in the storage tank.

2. The liquefied hydrogen storage tank according to claim 1, wherein the one or more floating plates are formed of a heat insulating material having a lower density than the liquefied hydrogen and having buoyancy.

3. The liquefied hydrogen storage tank according to claim 1, wherein the one or more floating plates comprise:

a body; and a powdered heat insulating material packed in the body.

4. A method for controlling a temperature of the liquefied hydrogen storage tank according to claim 1, comprising:

suppressing evaporation of the liquefied hydrogen stored in the liquefied hydrogen storage tank by solidifying the surface layer of the liquefied hydrogen through cooling of the upper space.

5. A method for controlling a temperature of the liquefied hydrogen storage tank according to claim 2, comprising:

suppressing evaporation of the liquefied hydrogen stored in the liquefied hydrogen storage tank by solidifying the surface layer of the liquefied hydrogen through cooling of the upper space.

6. A method for controlling a temperature of the liquefied hydrogen storage tank according to claim 3, comprising:

suppressing evaporation of the liquefied hydrogen stored in the liquefied hydrogen storage tank by solidifying the surface layer of the liquefied hydrogen through cooling of the upper space.

* * * * *